United States Patent
Mestdagh et al.

(10) Patent No.: US 11,240,994 B2
(45) Date of Patent: Feb. 8, 2022

(54) VIDEO CAMERA TRAP FOR ECOLOGICAL RESEARCH

(71) Applicant: LUXEMBOURG INSTITUTE OF SCIENCE AND TECHNOLOGY (LIST), Esch-sur-Alzette (LU)

(72) Inventors: Xavier Mestdagh, Martelange (BE); Lionel L'Hoste, Moulins-les-Metz (FR); Nicolas Tytgat, Hellebecq (BE)

(73) Assignee: Luxembourg Institute of Science & Technology (LIST), Esch-sur-Alzette (LU)

( * ) Notice: Subject to any disclaimer, the term of this patent is extended or adjusted under 35 U.S.C. 154(b) by 324 days.

(21) Appl. No.: 16/471,341

(22) PCT Filed: Dec. 21, 2017

(86) PCT No.: PCT/EP2017/084132
§ 371 (c)(1),
(2) Date: Jun. 19, 2019

(87) PCT Pub. No.: WO2018/115301
PCT Pub. Date: Jun. 28, 2018

(65) Prior Publication Data
US 2020/0037584 A1    Feb. 6, 2020

(30) Foreign Application Priority Data

Dec. 21, 2016    (LU) .......................................... 93388

(51) Int. Cl.
*A01K 61/90*    (2017.01)
(52) U.S. Cl.
CPC .................................... *A01K 61/90* (2017.01)
(58) Field of Classification Search
CPC ...... G02B 6/00; G02B 6/0026; G02B 6/0045; G02B 6/0073; G02B 6/0055;
(Continued)

(56) References Cited

U.S. PATENT DOCUMENTS

| | | | |
|---|---|---|---|
| 5,222,458 A | 6/1993 | Pippy | |
| 5,555,161 A * | 9/1996 | Roe ......................... | F16H 63/42 116/202 |

(Continued)

FOREIGN PATENT DOCUMENTS

| | | | | |
|---|---|---|---|---|
| CN | 107156001 A * | 9/2017 | ........... | G01F 23/292 |
| FR | 2999622 A1 * | 6/2014 | ............. | A01K 61/90 |

(Continued)

OTHER PUBLICATIONS

Madden et al.; Farewell to the bottle trap? An evaluation of aquatic funnel traps for great crested newt surveys (*Triturus cristatus*); Herpetological Journal; vol. 23, pp. 241-244 (2013) (Year: 2013).*

(Continued)

*Primary Examiner* — Timothy D Collins
*Assistant Examiner* — Brittany A Lowery
(74) *Attorney, Agent, or Firm* — Sandberg Phoenix & von Gontard P.C.

(57) ABSTRACT

An apparatus for producing ventral images of aquatic organisms, such as amphibians, for example, of newts the apparatus comprising a hollow conduct and a watertight container. The hollow conduct has a first opening and a second opening being opposed from each other. The hollow conduct and the watertight container are separated by a wall which transmits the wavelengths comprised between 390 nm and 1.4 µm. The apparatus is opaque to the wavelengths comprised between 390 nm and 1.4 µm. The watertight container comprises an underwater video camera oriented towards the wall. The apparatus is remarkable in that the watertight container is positioned below the hollow conduct, the watertight container being filled with clean water. Additionally, a method for detecting, identifying and/or individualizing aquatic animals.

14 Claims, 5 Drawing Sheets

(58) Field of Classification Search
CPC .......... G02B 6/0031; G02B 19/0028; G02B 6/0051; G02B 19/0095; G02B 19/009; A01K 63/06; A01K 85/01; A01K 61/90; A01K 61/59; A01K 1/0052; A01K 1/0058; A01K 61/70; A01K 63/04; A01K 63/065
See application file for complete search history.

(56) References Cited

U.S. PATENT DOCUMENTS

| 5,823,140 | A | * | 10/1998 | Pittet | ...... | A01K 61/59 119/174 |
|---|---|---|---|---|---|---|
| 2013/0050465 | A1 | | 2/2013 | Beck | | |
| 2017/0293217 | A1 | * | 10/2017 | Gallager | ...... | A01K 61/90 |

FOREIGN PATENT DOCUMENTS

| WO | 2015173838 A1 | 11/2015 | | |
|---|---|---|---|---|
| WO | 2016004527 A1 | 1/2016 | | |
| WO | WO-2016004527 A1 | * | 1/2016 | ......... G01N 33/18 |

OTHER PUBLICATIONS

International Search Report for corresponding PCT/EP2017/084132, dated Mar. 23, 2018.
Weddeling et al.; Bias in Estimation of Newt Population Size: A Field Study at Five Ponds Using Drift Fences, Pitfalls and Funnel Traps; Herpetological Journal, vol. 14, pp. 1-7 (2004).
Unglaub et al.; Linking Habitat Suitability to Demography in a Pond-Breeding Amphibian Frontiers in Zoology—May 2015, pp. 1-10.
Pellet et al.; Estimating Population Size in the European Tree Frog (*Hyla arborea*) Using Individual Recognition and Chorus Counts; Amphibia-Reptilia 28 (2007): 287-294.
Mettouris et al.; A Newt Does Not Change Its Spots: Using Pattern Mapping for the Dentification of Individuals in Large Populationsof Newt Species; Ecological Research Feb. 2016.
Favaro et al.; Trapcam: An Inexpensive Camera System for Studying Deep-Water Animals; Methods in Ecology and Evolution 2012, 3, 39-46.
Biggs et al.; Using Edna to Develop a National Citizen Science-Based Monitoring Programme for the Great Crested Newt (*Triturus cristatus*); Biological Conservation 183 (2015) 19-28.

\* cited by examiner

VIDEO CAMERA TRAP FOR ECOLOGICAL RESEARCH

CROSS-REFERENCE TO RELATED APPLICATIONS

The present invention is the US national stage under 35 U.S.C. § 371 of International Application No. PCT/EP2017/084132, which was filed on Dec. 21, 2017, and which claims the priority of application LU 93388 filed on Dec. 21, 2016, the content of which (text, drawings and claims) are incorporated here by reference in its entirety.

FIELD

The invention is directed to the field of ecological research and/or wildlife tracking. More particularly, the invention concerns an apparatus allowing for the detection and the identification of aquatic amphibians, in particular newts, by providing ventral pattern images and/or ventral images of the animal. The invention also concerns a method for detecting and identifying aquatic animals.

BACKGROUND

Estimating newt population size with accuracy is difficult but of significance importance to fulfil legal obligations, to be used as bioindicator, or to study biotic and abiotic interactions with their environment.

Genetic analysis of environmental DNA (eDNA) in water performs very well in detecting the presence of a species in a site, with a relatively simple water sampling protocol and no habitat disturbance (Biggs J. et al., Biological Conservation, 2015, 183, 19-28). However, this technique fails in providing species abundance estimates and its population structure.

Several methods have been tested or used to produce abundance data like for instance torch counts from the bank, dip net fishing, egg counts, drift fences, pitfalls, and traps (bottle or funnel traps), but all of them do have an imperfect and relatively variable detection rate (Weddeling K. et al., Herpetological J., 2004, 14, 1-7). For instance, net trapping, which has a relatively low detection rate of some species, is a highly disturbing method for the habitat and the individuals themselves. Furthermore, for direct night observation implying the use of flashlights, this method is not suitable in ponds presenting a high degree of turbidity, neither in dense vegetation nor in deep waters.

Funnel traps systematically require two site visits per trapping night (set down and pick up) and the handling of any trapped individual.

Natural body pattern is a trustworthy mark to identify and/or individuate species, in particular for Alpine newt (*Ichthyosaura vulgaris*), smooth newt (*Lissotriton vulgaris*) (Mettouris O. et al., Ecol. Res., 2016, 31, 483-489), and several other species like the great crested newt (*Triturus cristatus*) (Unglaub B. et al., Front. Zool., 2015, 12:9) or the European tree frog (*Hyla arborea*) (Pellet J. et al., Amphibia-Reptilia, 2007, 28, 287-294). Typically, this implies to trap and handle each individual one by one, on the field, to take a picture in a standardized position and at repeated occasion. This process is time-consuming and might be considered as disturbing. Moreover special authorization in case of protected species is required.

The development and the use of camera traps largely contributed to improve ecology, distribution or abundance knowledge of several species. One of the main interests of camera traps lies in the fact that they are automated and do not continuously take pictures: surveys last several days and can be conducted simultaneously on different sites. Pictures are associated to a timestamp, stored and analyzed later with automatic solutions. Sampling sites can be multiplied and large datasets with a high geographical and temporal resolution can be easily produced.

A study uses an underwater video recording system (Favaro B. et al., Methods in Ecology and Evolution, 2012, 3, 39-46) but neither position of the subject nor the background are standardized, limiting the interpretation of the imagery. Some systems aim to bring the subject in a defined position and in front of a bright and contrasting background to take lateral or top view imagery. In these cases, fish species are determined on the basis of the outlines of silhouette, which is enhanced by the contrasting background.

U.S. Pat. No. 5,222,458 A relates to an apparatus for monitoring aquatic organisms that allows high contrast silhouette images of moving aquatic organisms against a brightly lit background.

However, in the case of newts, a silhouette does not provide sufficient information to determine the species. A silhouette does not provide either a good picture of the body colour pattern of the animal, while it has been determined that for identifying newt, the natural body pattern is fundamental.

FIG. 1 illustrates an adult newt (*Triturus cristatus*) with its size:
The length of the newt is generally comprised between 12 cm and 18 cm.
The width of the newt is generally comprised between 4 cm and 6 cm.
The height of the newt is generally comprised between 2 cm and 2.5 cm.

International patent application published WO 2016/004527 A1 relates to a method of determining a variable of interest associated with a sample having a quantity of organisms received in a container.

SUMMARY

The invention has for technical problem to alleviate at least one of the drawbacks present in the prior art. More particularly, the invention has for technical problem to provide an apparatus suitable for detecting, identifying and when possible individualizing aquatic animals, such as amphibians, by providing ventral pattern images of the animals with no catching or handling them.

The first object of the invention is directed to an apparatus for producing ventral images of aquatic organisms, in particular of amphibians, more particularly of newts, the apparatus comprising a hollow conduct and a watertight container. The hollow conduct has a first opening and a second opening being opposed from each other. The hollow conduct and the watertight container are separated by a wall which transmits the wavelengths comprised between 390 nm and 1.4 µm. The apparatus is opaque to the wavelengths comprised between 390 nm and 1.4 µm. The watertight container comprises an underwater video camera oriented towards the wall. The apparatus is remarkable in that the watertight container is positioned below the hollow conduct, the watertight container being filled with clean water.

According to various embodiments, the wall is optically transparent.

According to various embodiments, the hollow conduct is made of titanium materials and/or plastic materials, the plastic materials being in various instances polyvinyl chloride and/or polypropylene.

According to various embodiments, the watertight container comprises at least two light-emitting diodes emitting light indirectly towards the wall, the light having a wavelength in various instances comprised between 390 nm and 1.4 μm.

According to various embodiments, the light-emitting diodes are topped with a deflector to avoid light dazzling spots in the field of vision of the video camera, the deflector being in various instances conic.

According to various embodiments, the watertight container has an inner surface coated with a light reflective material, in various instances aluminium.

According to various embodiments, the wall is made of poly-(methyl methacrylate) and/or glass, in various instances of poly-(methyl methacrylate).

According to various embodiments, the poly-(methyl methacrylate) and/or glass have an anti-reflective coating and/or an anti-scratch coating.

According to various embodiments, the video camera is connected to a mini digital video recorder, in various instances a mini digital video recorder with a motion detection mode, the connection being wired or wireless.

According to various embodiments, the watertight container comprises means for regulating the clean water content in the watertight container, the means being in various instances a clean water input and/or a pressure valve.

According to various embodiments, the apparatus further comprises spotting means and/or floating means and/or handling means.

According to various embodiments, the hollow conduct further comprises an outer wall opposed to the optically transparent wall, the outer wall having an internal face comprising an inner wall with a length inferior to the distance between the first opening and the second opening, the inner wall being located at equal distance from the first opening and the second opening, and in that the hollow conduct further comprises means for creating at least one wave, the means being located between the internal face of the outer wall and the inner wall.

According to various embodiments, the hollow conduct is a first conduct and the apparatus comprises a second hollow conduct which is perpendicular to the first conduct, the second hollow opaque conduct comprising two openings opposed to each other.

According to various embodiments, at least one of the first opening, the second opening and the openings of the second hollow conduct is connected to a funnel trap.

According to various embodiments, the first and second opening have a semi-circular shape or a trapezoidal shape.

According to various embodiments, the wall is flat.

According to various embodiments, the wall has a thickness comprised between 2 mm and 5 mm, preferential equal to 3 mm.

According to various embodiments, the video camera further comprises a timer.

According to various embodiments, the size of the conduct is configured to host an aquatic organism, in various instances an amphibian, for example a newt.

According to various embodiments, the hollow conduct, the watertight container, the wall and/or the waterproof video camera are removable.

According to various embodiments, the apparatus further comprises at least one float and/or at least one connection to at least one float.

According to various embodiments, the container comprises a valve configured to remove bubble of air.

According to various embodiments, the video camera further comprises a battery.

According to various embodiments, the wall comprises dimensional markers and/or graduation markers.

According to various embodiments, the first and second openings are disposed along the longitudinal axis of the apparatus.

The second object of the invention is directed to a method for detecting, identifying and/or individualizing aquatic animals, in particular amphibians, more particularly newts, comprising the steps of (a) providing the apparatus in accordance with the first object of the invention in water, (b) processing the recordings of the video camera with a computer, and (c) analyzing the ventral images of the aquatic animals.

According to various embodiments, the method comprises the step between the steps (a) and (b) of creating within the hollow conduct of the apparatus at least one wave in the water.

In general, the particular embodiments of each object of the invention are also applicable to other objects of the invention. Insofar as possible, each object of the invention is combinable with other objects.

In comparison with the state-of-the-art observation tools massively used in biological studies, the invention is particularly interesting in that the apparatus is able to produce ventral imagery of newts without disturbing them (no capture, no handling), in a standardized position, in a continuous manner (for several days for instance), and automatically (in the sense that no presence is required for the apparatus to function). The invention requires less human resources and produces datasets with higher temporal resolution thanks to the timestamp of any single observation.

Threatened and rare species are particularly intensively surveyed in the sake of nature conservation interests, an observation tool and method to survey them are therefore particularly of interest.

The invention produces imagery where body patterns are clearly visible while other apparatus producing underwater imagery of aquatic animals in a standardized position enhances the silhouette, masking essential species and individual criteria for several species.

The invention is easily transportable from a site to another by a single person.

Those ventral images allow for the extraction and analysis of several data, such as the species, the sex, the phenology, the body length (if dimensional markers are placed on the transparent wall), the individualization through analysis of the belly patches.

It avoids a concentration of individuals in a basket, thus reducing the transmission of disease.

Data related to the species conservation status assessment or monitoring of nature conservation actions can be determined.

It is also remarkable that since this way of observing aquatic animals is not harmful, anybody that would like to perform such observations could use it without requiring derogations to nature protection laws.

By automating the observation of the individuals, the present invention enables to acquire large dataset with less effort (notably in comparison with the CMR technique) and therefore enhances the quality of the estimation of the population size.

DRAWINGS

DETAILED DESCRIPTION

Apparatus for the Detection and the Identification of Aquatic Amphibians

The apparatus for producing ventral images of aquatic organisms, for example newts, must be shaped and fitted to welcome those animals.

Figure 1:
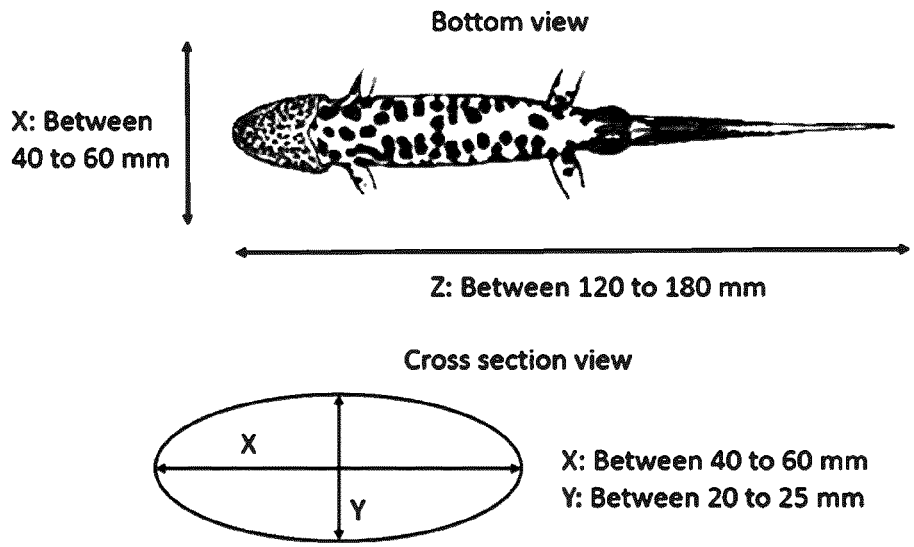
FIG. 1 depicts an adult newt (*Triturus cristatus*) with its size shown, in accordance with various embodiments of the invention.
Figure 2:
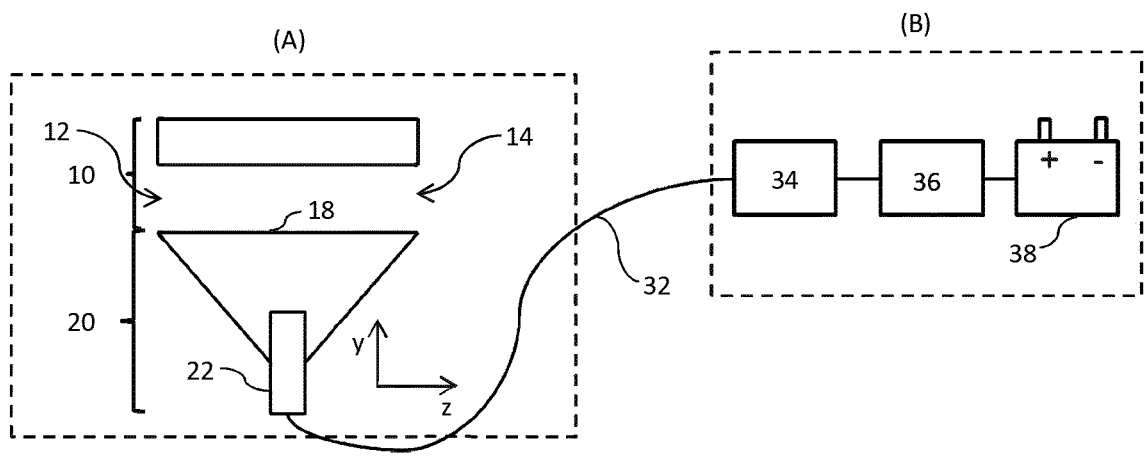
FIG. 2 shows a general design of the apparatus, in accordance with various embodiments of the present invention.
Figure 3:
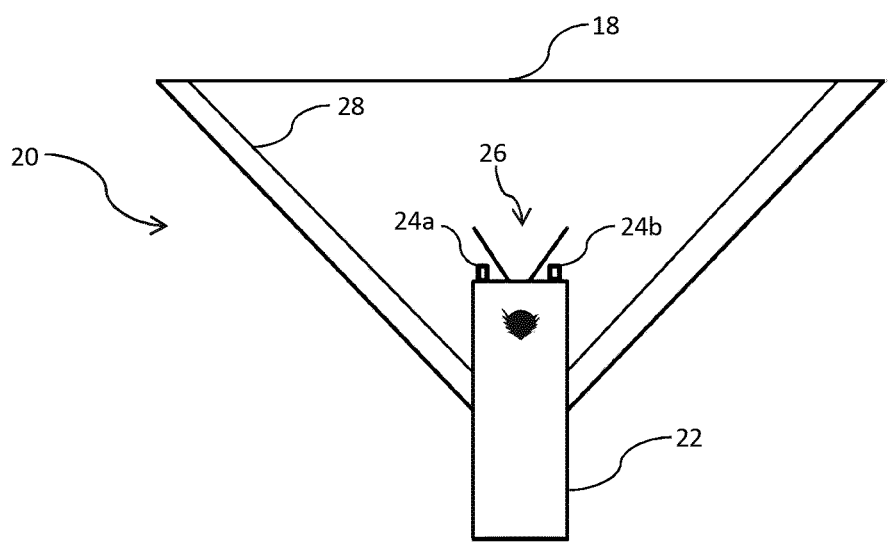
FIG. 3 is an enlargement of the aquatic part of the apparatus, in accordance with various embodiments of the present invention.

In accordance with an exemplary first embodiment of the invention, the apparatus for producing ventral images of aquatic organisms can be divided in one aquatic part (A) and in one onshore part (B), as seen on the scheme of FIG. 2. FIG. 3 also presents an enlargement of the aquatic part (A).

The aquatic part (A) of the apparatus aims to produce ventral images of individuals in water, and is connected to an onshore part (B) controlling the camera and storing the video signal.

FIGS. 5, 6, 7 and 8 illustrate the apparatus of the present invention according to the exemplary first embodiment.

The aquatic part of the apparatus can comprise funnel-shaped entrances that have as goal to lead the newts into a hollow conduct 10. Such conduct 10 can be for instance a polyvinyl chloride tube that is half cut in the direction of the length of the tube.

The hollow conduct 10 comprises a first opening 12 and a second opening 14. The funnel traps, or funnel-shape entrances (16a, 16b), are optional but can favor the entrance and the exit of the aquatic organisms by guiding them. When funnel traps (16a, 16b) are used, the base of those funnel traps is in various instances flat.

Once the free-swimming amphibian is inside the hollow conduct 10, it walks and/or swims from one of the opening to the other opposing opening by walking on an optically transparent wall 18, the wall 18 being thus considered as the floor on which the animals can move.

The floor/wall 18 is optically transparent to the visible light (with wavelength comprised between 390 nm and 700 nm) and to the near-infrared light (with wavelength comprised between 700 nm and 1.4 μm). The optical transparency allows an optical device placed below the wall 18 in a watertight container 20 to study the animals passing through the hollow conduct 10. It is obvious that such optical device must be oriented to visualize the wall 18.

The optically transparent wall 18 is made of semi-transparent material, for example of (poly-(methyl methacrylate) or Plexiglas®. It can also be made of glass. However, Plexiglas® can be more applicable, since it is lighter than glass.

In order to render unbreakable (or at least sufficiently resistant to the environmental constraints) the wall 18, its thickness is comprised between 2 mm and 5 mm, in various instances 3 mm. The resistance of the Plexiglas® is also higher than the resistance of the glass.

Advantageously, the optically transparent wall 18 has an anti-scratch coating, in order to reinforce the protection of the wall 18.

Advantageously, the optically transparent wall 18 is horizontal and/or includes graduation marks for length measurement of the animal.

Advantageously, the optically transparent wall 18 comprises an anti-reflective coating, to avoid dazzling spots on the video recordings.

The size of the conduct 10 is configured to host an aquatic organism, in various instances an amphibian, for example a newt, the size being advantageously increased of about 10% of the size of the aquatic organism.

The distance according to the Z axis, or the longitudinal axis, between both openings (12 and 14), is thus generally equal to 20 cm, or superior to 20 cm. This defines the total length of the hollow conduct 10.

The width, according to the X axis, of the hollow conduct 10 is thus generally equal to 7 cm, or superior to 7 cm.

The height, according to the Y axis, of the hollow conduct 10 is thus generally equal to 3 cm, or superior to 3 cm.

The openings (12, 14) can be of semi-circular shape, presenting a diameter comprised between 4 cm and 7 cm, or more than 7 cm.

The openings (12, 14) can alternatively be of trapezoidal shape, in various instances an isosceles trapezoid, presenting a size of legs (the sides of equal length) comprised between 2.5 cm and 4 cm, or superior to 4 cm. The larger base has a length generally equal to 7 cm, or superior to 7 cm, while the smaller base has a length generally equal to 4.5 cm, or superior to 4.5 cm.

It is to be understood that larger animals can be studied if the size of the hollow conduct 10 is enlarged. The smaller animals can be observed as well, even if the size of the hollow conduct 10 is considerably bigger than the smaller animals.

It is also to be understood that in order to select the type of animal to be studied, in particular if the goal is to study small animals, it is advantageous for the user to use a conduct with smaller size, avoiding subsequently the detection of larger animals that would be unable to penetrate into the hollow conduct 10.

The openings (12, 14) can be of any other alternative shape. They need in various instances to be opposite from each other in order to allow for the animal to cross them without zigzagging. This also facilities the arrangement of an optical device for studying them (see below).

In order to enhance the detection of the animal, the apparatus must be opaque to the visible light (notably the light coming from the surroundings) and to the near-infrared light. All the walls of the hollow conduct 10 and of the watertight container 20 must be opaque (except the wall 18 separating the conduct and the container which is the only wall 18 in the whole apparatus to be optically transparent).

In order to render the apparatus easy to handle by a user, the materials that have been chosen to make the apparatus are light material, such as titanium material and/or plastics materials. Examples of plastic materials are polyvinyl chloride and/or polypropylene.

Below this transparent floor 18 is located a watertight container 20 with an underwater video camera 22 (e.g. an underwater video camera of the brand Aqua Vu®) at its bottom.

The underwater video camera 22 is maintained with silicon in a polypropylene drainpipe, this latter being able to move up and down in the watertight box 20.

As shown on FIG. 3, two build-in LEDs (24a, 24b) beside the lens of the video camera 22 supply near-infrared lighting.

A conic deflector 26 is set at the top of the video camera 22 so that near-infrared lights from the LEDs (24a, 24b) are not directly reflected to the lens by the transparent floor 18 (to avoid dazzling bright spots). In fact, it reflects the light to the inner walls of the container 20 before reaching the optically transparent wall 18.

Figure 4:
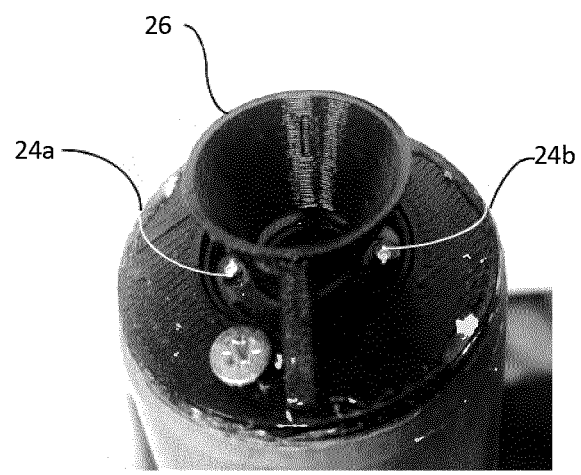
FIG. 4 shows a funnel-shaped deflector in accordance with an exemplary first and an exemplary second embodiment of the present invention.
Figure 5:
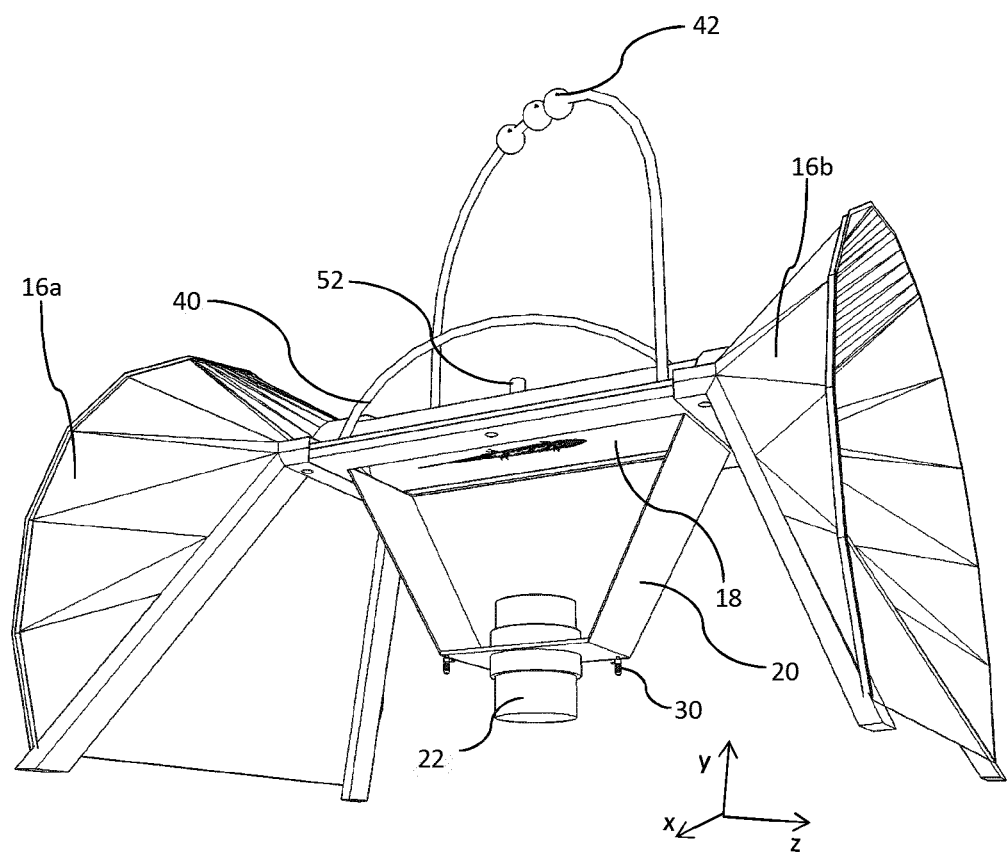
FIG. 5 shows a first overview of the apparatus in accordance with the exemplary first embodiment of the present invention.
Figure 6:
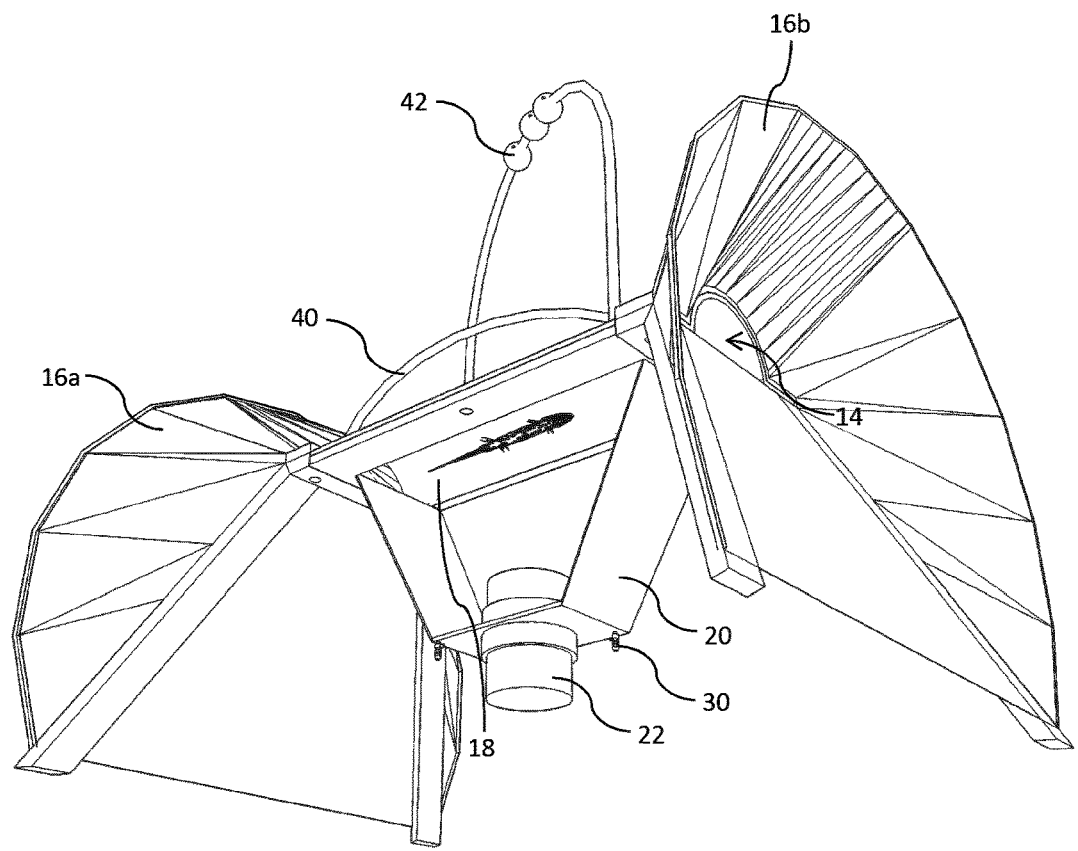
FIG. 6 shows a second overview of the apparatus in accordance with the exemplary first embodiment of the present invention.

Alternatively, the deflector 26 might be also a funnel-shaped deflector, as shown on FIG. 4.

Such deflector 26 can be developed by using a 3D printer.

The deflector 26 produces a diffuse lighting inside the watertight opaque container 20.

To improve a homogenous lighting, the inner surface 28 of the watertight container 20 is covered with a reflective material, for instance aluminium.

The watertight container 20 is filled in with clean water to limit disturbances from natural turbidity of the pond. This allows the watertight container 20, and subsequently the whole apparatus, which are made in light material (see above) to stay stable into the water of the pond. Clean water also allows for preventing that moving particles are present in the field of the video camera 22. Another advantage of the clean water also limits the number of particles and unwanted organisms which could accidentally trigger the video camera 22. Water turbidity of the pond has a limited impact on image quality thanks to the watertight container 20 full of clean water where the video camera 22 is located. It was indeed noted that when the video camera 22 was placed directly below the optically transparent wall 18, false triggering of the video camera 22 was induced by the turbidity of the water flowing through the conduct 10.

The watertight container 20 includes at least one hole to fill clean water and/or at least one pressure valve configured to remove bubbles of air. These means 30 are thus suitable for regulating the water content inside the watertight container 20.

As shown on FIG. 2, the onshore part (B) of the apparatus is connected to the underwater video camera 22 through an electric cable 32. The connection might also be wireless.

A mini digital video recorder (DVR) 34, with a motion detection mode, powers the video camera 22 and the LEDs (24a, 24b), and stores the video signal on a SD card.

The mini DVR 34 can be for example of the type DVRTAXI from the company ELRO.

A recording of 30 frames by second and a resolution of 640×480 VGA allows for species recognition.

The advantage of the motion detection mode is to limit the number of produced files, because it triggers the video camera 22 once there is motion inside the hollow conduct 10. Subsequently, the amount of work for the analyst is reduced because only videos of interests (with an aquatic animal passing by the conduct 10) are recorded.

The area of motion detection might be adapted and is usually set at the entrances (i.e., the first opening 12 and the second opening 14) of the tunnel to reduce the number of false triggering by aquatic particles. Once a movement is detected in the detection area, the video signal starts to be recorded on the SD card, including the 10 seconds preceding and following a motion detection. If a motion is detected during more than 10 seconds, the video sequence is split in several files of maximum 30 seconds length.

A timer 36 between a battery 38 and the DVR 34 allows scheduling working periods in order to save power and storage capacity by focusing on periods of interest (e.g. night). The presence of such timer 36 is not compulsory if it is desirable to study diurnal and nocturnal animals in the same set of experiment. For instance, the battery 38 might be a lead acid battery, producing an electrical potential of 12V and an intensity of 12 Ah.

The aquatic part (A) of the apparatus might be handled into and out of the pond using a pole with a hook so that there is no need for the user to enter into the water.

At least one wire 40 can be present to enable the user to carry the aquatic part (A) with a hook and set/remove it into water. At least one float 42, optionally attached on the wire 40, enables to easily find the apparatus in water.

Figure 7:
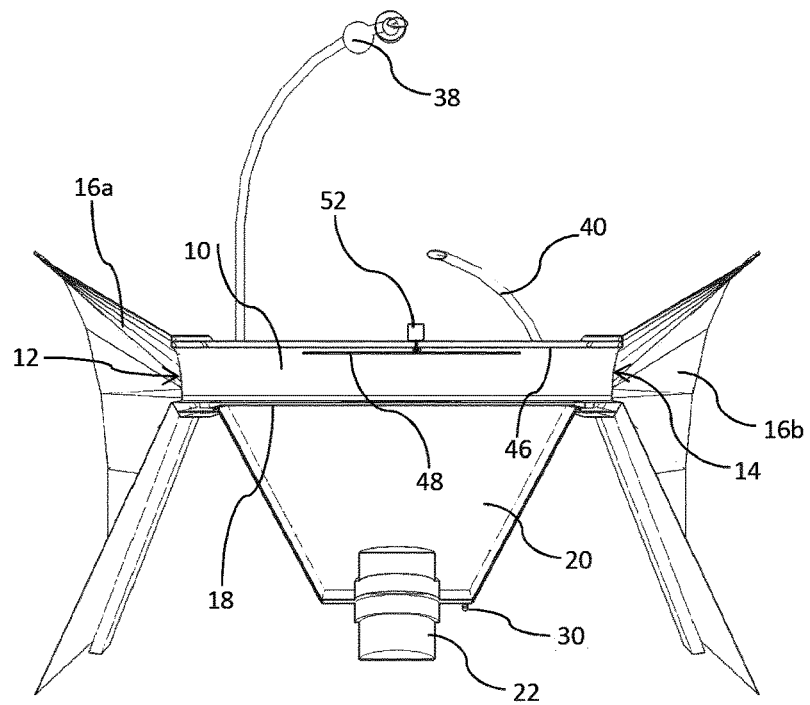
FIG. 7 shows a third overview of the apparatus in accordance with the exemplary first embodiment of the present invention.

As shown on FIG. 7, the apparatus of the present invention further comprises a system to attract the aquatic organism inside the hollow conduct 10. This system consists in producing a disturbance in the water inside the conduct 10 in order to mimic the presence of another animal(s) and to encourage the aquatic organism, especially the newt, to cross the conduct 10 (and in the meantime to trigger the video camera 22) to see what is occurring at the other side of the conduct 10.

Figure 8:
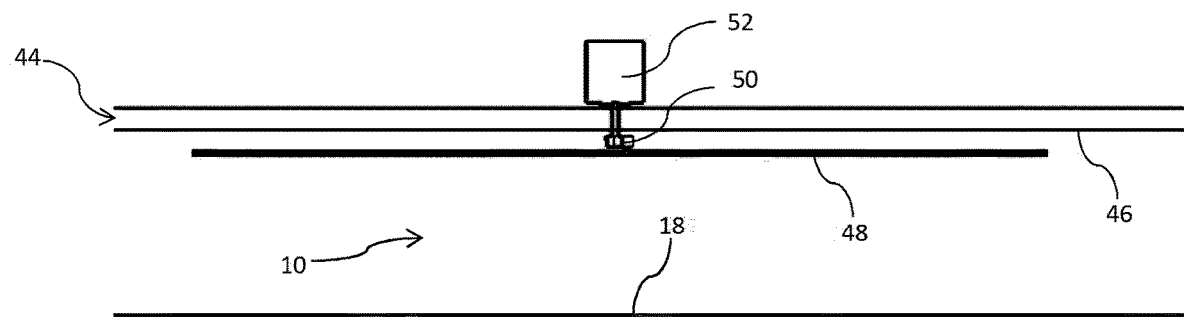
FIG. 8 shows an enlargement of FIG. 7, in accordance with various embodiments of the invention.

As shown on the enlargement of FIG. 8, the hollow conduct 10 further comprises an outer wall 44 opposed to the optically transparent wall/floor 18. The outer wall 44 can be considered as the ceiling of the hollow conduct 10, the aquatic organism, especially the newt, being supposed to walk and/or swim on the optically transparent floor/wall 18. The outer wall 44 comprises on its internal face 46 an inner wall 48 which has a length that is inferior or equal to two third of the total length of the conduct 10, the total length being defined by the distance between the first opening 12 and the second opening 14. The inner wall 48 is located in the middle of the length of the conduct 10, in order not to cover the internal face 46 of the outer wall 44 at proximity of the openings (12, 14). The system to attract the aquatic organisms comprises means 50 for creating at least one wave in the water, the means 50 being located between the internal face 46 of the outer wall 44 and the inner wall 48. The means 50 are located at the middle of the length of the conduct 10. The means 50 are connected to a device 52 through the outer wall 44. The device 52 works with a battery (not shown) and/or is connected through a wire (not shown) to the onshore part (B) of the apparatus.

As the length of the inner wall 48 does not extend over the total length of the conduct 10, the wave(s) that is/are created by the means 50 for creating at least one wave, is felt in the conduct 10 by the aquatic organisms only at the proximity of the openings (12, 14). This will exacerbate the natural curiosity of the animals that will be then tempted to enter in the hollow conduct 10 (by one or another openings (12, 14)) and to cross it to see what is occurring at the other side of the conduct 10. By doing this, as explained above, the motion detection mode of the mini digital video recorder will trigger the underwater video camera 22 and the recordings of the aquatic organisms passing through the hollow conduct 10 will work. The users are thus able to shoot ventral images of the aquatic organism passing through the conduct 10.

The inner wall 48 must be located in the middle of the length of the conduct 10 in order prevent the artificial wave created by the means 50 to falsely trigger the underwater video camera 22.

The means 50 can be for example a helix, a propeller, or a metallic ribbon.

Figure 9:
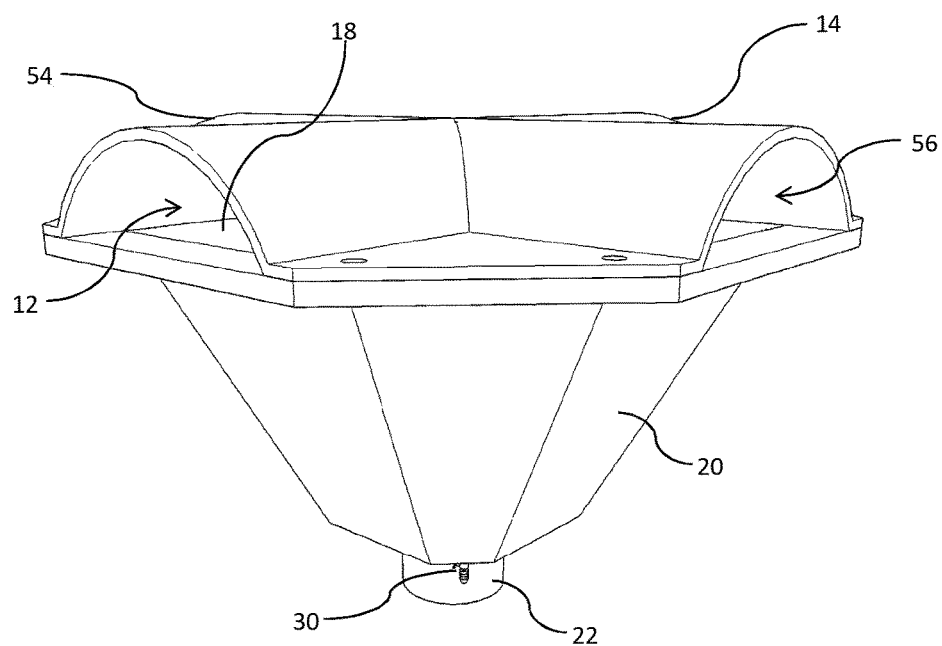
FIG. 9 shows an overview of the apparatus in accordance with an exemplary second embodiment of the present invention.

In an exemplary second embodiment of the invention, the hollow conduct (10) of the exemplary first embodiment is a first conduct and the apparatus comprises a second hollow conduct which is perpendicular to the first conduct (10), the second hollow conduct comprising two openings opposed to each other. The apparatus for producing ventral images of aquatic organisms has therefore four openings (12, 14, 54, 56), being opposed two by two, as shown on FIG. 9.

In various alternatives, similar apparatus can be made with more openings.

The advantage of providing more than two openings is to increase the probability of shooting a video of a newt.

Study Area

The apparatus has been tested in a pond south-west of the Grand-Duchy of Luxembourg (5.90E 49.56N) where the four native species are known to occur: *Lissotriton helveticus* (Razoumovsky 1789), *Lissotriton vulgaris* (Linnaeus 1758), *Ichthyosaura alpestris* (Laurenti 1768) and *Triturus cristatus* (Laurenti 1768).

Method

The apparatus in accordance with various embodiments of the invention was set in the pond during 40 nights between May and mid-June 2016. This corresponds to the newt reproduction season and enhances therefore the chance to detect these aquatic animals. The timer 36 was scheduled to power the video camera 22 between 8 µm and 8 am.

The study site was visited regularly in order to check the storage capacity and the power of the battery. The video produced by the apparatus on the SD card was transferred to a field computer. A standard funnel trap was occasionally used for comparison.

Video visualization was done on a desk computer using VLC media player at an accelerated playback speed (up to 8×) in order to quickly highlight videos with an animal.

Both the standard funnel trap and the invention detected the four newt species occurring in the pond. The species on about 2% of the videos could not be determined. About half of the videos were related to *Triturus cristatus*. *Triturus cristatus* crosses the apparatus mainly slowly, using its legs. *Lissotriton vulgaris* is more often using its tail and is therefore faster.

The number of individuals observed by the apparatus was higher with funnel trap, or funnel-shaped entrances 16a and 16b, than without.

It is worth to note that such method can be used for other aquatic animals, such as for instance crayfish. In order to observe other aquatic animals, it might be necessary to modify the funnel-shaped entrances. The semicircular tube 10 might be replaced by transparent tubes of several section sizes, open on one of their extremity, and displaced side by side so that the video camera 18 is oriented perpendicularly to the length of the tubes.

The invention claimed is:

1. An apparatus for producing ventral images of aquatic organisms, said apparatus comprising:
    a hollow conduct with a first opening and a second opening, the first and second opening being opposed from each other; and
    a watertight container,
    wherein the hollow conduct and the watertight container are separated by a wall, the wall transmitting the wavelengths comprised between 390 nm and 1.4 µm,
    wherein the apparatus, except for the wall, is opaque to the wavelengths comprised between 390 nm and 1.4 µm,
    wherein the watertight container comprises an underwater video camera oriented towards the wall,
    wherein the watertight container is positioned below the hollow conduct, the watertight container being filled with clean water, and
    wherein the hollow conduct further comprises an outer wall opposed to the optically transparent wall, the outer wall having an internal face comprising an inner wall with a length inferior to the distance between the first opening and the second opening, the inner wall being located at equal distance from the first opening and the second opening, and wherein the hollow conduct further comprises a means for creating at least one wave, the means being located between the internal face of the outer wall and the inner wall, said means for creating at least one wave is a helix, a propeller, or a metallic ribbon.

2. The apparatus according to claim 1, wherein the hollow conduct is made of at least one of titanium materials and plastic materials, the plastic materials being at least one of polyvinyl chloride and polypropylene.

3. The apparatus according to claim 1, wherein the watertight container comprises at least two light-emitting diodes emitting light indirectly towards the wall, the light having a wavelength comprised between 390 nm and 1.4 µm.

4. The apparatus according to claim 3, wherein the light-emitting diodes are topped with a deflector to avoid light dazzling spots in the field of vision of the video camera, the deflector being conic.

5. The apparatus according to claim 1, wherein the watertight container has an inner surface coated with a light reflective material.

6. The apparatus according to claim 5, wherein the watertight container has an inner surface coated with aluminium.

7. The apparatus according to claim 1, wherein the wall is made of at least one of poly-(methyl methacrylate) and glass.

8. The apparatus according to claim 7, wherein the at least one of poly-(methyl methacrylate) and glass have at least one of an anti-reflective coating and an anti-scratch coating.

9. The apparatus according to claim 1, wherein the apparatus further comprises a mini digital video recorder with a motion detection mode, the mini digital video recorder being connected to the video camera through one connection, the connection being one of wired or wireless.

10. The apparatus according to claim 1, wherein the watertight container comprises a means for regulating the clean water content in the watertight container, the means being at least one of a clean water input and a pressure valve.

11. The apparatus according to claim 1, wherein the apparatus further comprises a funnel trap, the funnel trap being connected to at least one of the first opening and the second opening.

12. The apparatus according to claim 1, wherein the hollow conduct is a first conduct and wherein the apparatus comprises a second hollow conduct which is perpendicular to the first conduct, the second hollow opaque conduct comprising two openings opposed to each other.

13. The apparatus according to claim 12, wherein the apparatus further comprises a funnel trap, the funnel trap being connected to at least one of the first opening, the second opening and the openings of the second hollow conduct.

14. A method for at least one of detecting, identifying and individualizing aquatic animals, said method comprising the steps of:

(a) providing the apparatus in water, wherein the apparatus comprises:

a hollow conduct with a first opening and a second opening, the first and second opening being opposed from each other; and a watertight container, wherein the hollow conduct and the watertight container are separated by a wall, the wall transmitting the wavelengths comprised between 390 nm and 1.4 µm, wherein the apparatus, except for the wall, is opaque to the wavelengths comprised between 390 nm and 1.4 µm, wherein the watertight container comprises an underwater video camera oriented towards the wall, and wherein the watertight container is positioned below the hollow conduct, the watertight container being filled with clean water;

(b) processing the recordings of the video camera with a computer so as to obtain a ventral images of the aquatic animals, and (c) analyzing the ventral images of the aquatic animals, and wherein the method further comprises a step between the steps (a) and (b) of creating within the hollow conduct of the apparatus at least one wave in the water.

* * * * *